July 14, 1931. J. S. REID 1,814,409
CLOSURE
Filed June 30, 1928
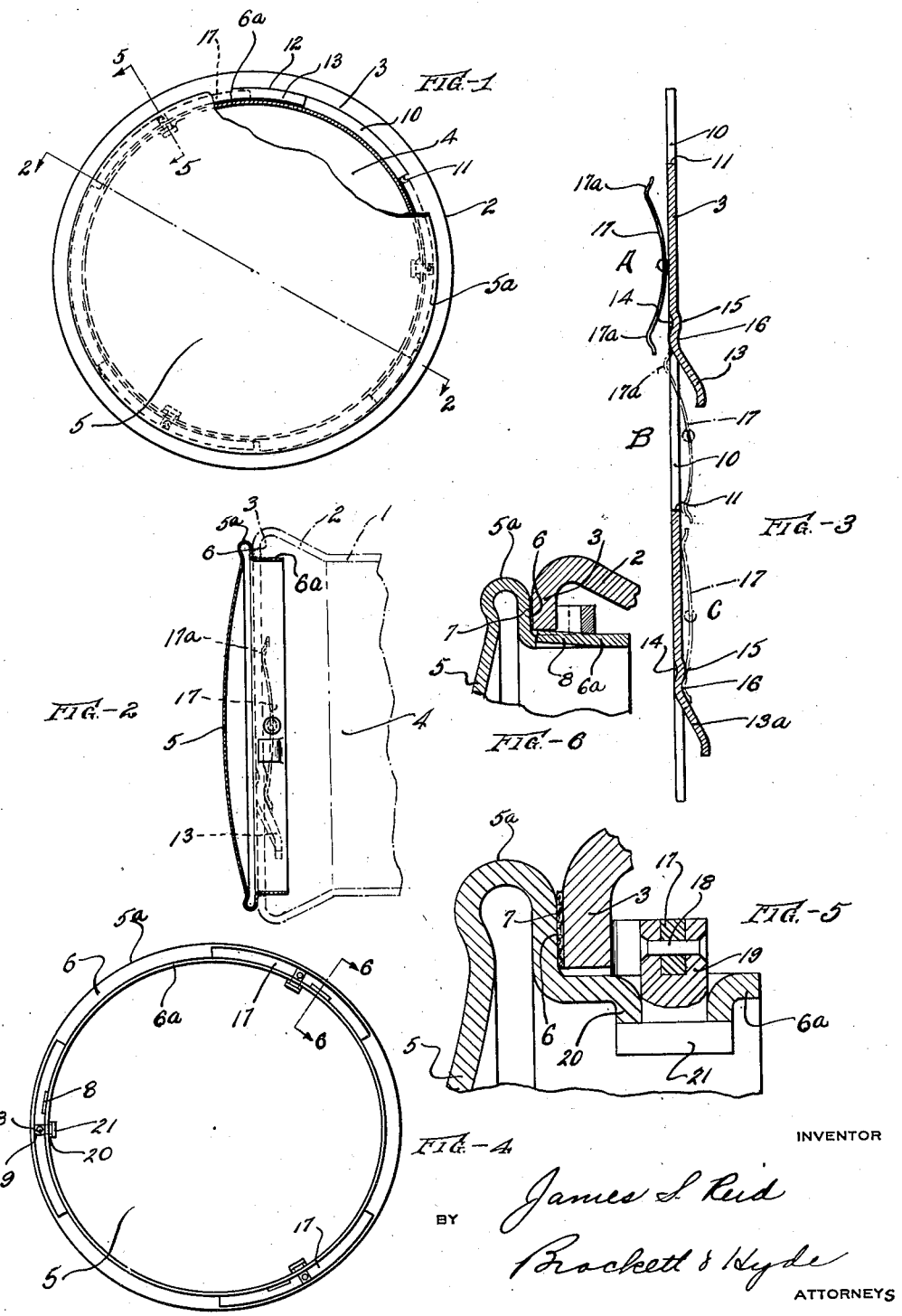
INVENTOR
James S. Reid
BY Brockett & Hyde
ATTORNEYS Patented July 14, 1931

1,814,409

UNITED STATES PATENT OFFICE

JAMES S. REID, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO

CLOSURE

Application filed June 30, 1928. Serial No. 289,531.

This invention relates to caps or closures of the bayonet lock type, such as are used for receptacles or other devices, one use of such caps or closures being to close the openings in the exposed ends of the hubs of vehicle wheels of any type, but with particular application to wheels with metal hubs, or hubs which include a metal sleeve or cylinder, such as wire wheels.

The object of the invention is to provide a very simple closure for the opening, which is very readily applied to or removed from its seat; which is firmly locked or held in place and is not liable to accidentally escape; which is tight and does not rattle; which completely closes the opening and prevents the escape of grease or lubricant and avoids the entrance of dirt; and which is so simple in construction that it can be made of few parts and is not likely to get out of order in service.

Further objects of the invention are in part obvious and in part will appear more in detail hereinafter.

In the drawings, which represent one suitable embodiment of the invention as applied to a hub cap, Fig. 1 is an end elevation of a portion of the wheel hub with the cap applied thereto, parts being broken out and in section to expose interior construction; Fig. 2 is a sectional elevation on the line 2—2, Fig. 1, looking in the direction of the arrows; Fig. 3 is a diagrammatic development of a portion of the wheel hub, illustrating the operation of one of the hub cap shoes in applying the cap to or removing it from the hub; Fig. 4 is an inside elevation of the cap, the view being taken from the right in Fig. 2; Fig. 5 is a sectional view on a larger scale, on the line 5—5, Fig. 1; and Fig. 6 is a detail section on the line 6—6, Fig. 4, showing the cap applied to a wheel.

In the drawings, which, for purposes of illustration and not with any intent of restriction, show the invention applied to a hub cap, only a portion of the wheel hub is shown, to wit, a sleeve 1 provided with a flared end portion 2 terminating in an inwardly extending annular wall or flange 3, said sleeve enclosing a cavity 4 into which the axle extends and in which the nut (not shown) for securing the wheel to the axle may lie to be accessible through the flange opening. It is therefore desirable to close said opening by a closure which provides a maximum opening for convenience in manipulating the nut and for the application of lubricant when necessary, and which cap is readily applied and removed and will not escape.

The cap shown in the drawings is made of sheet metal pressed or formed to shallow cup shape, with a slightly domed disc-like body portion 5 bounded by a peripheral bead or rolled portion 5a, beyond which is the cylindrical depending flange or skirt 6a. The bead or rolled portion 5a, formed by a re-entrant or inwardly extending portion of the metal is larger in diameter than the opening in the flange 3 and when the cap is applied to the wheel, as in Fig. 6, said re-entrant portion of the metal forms an annular transverse wall 6 which seats against the flange 3 and forms a tight fit therewith, establishing a complete closure of the opening and preventing entrance of dirt or escape of lubricant. A gasket 7 (Fig. 5) may be inserted to further seal the opening, if desired, although this is not essential.

The skirt 6a telescopes within the edge of the flange 3 and said skirt may be provided with means, preferably yielding, adapted to rigidly and firmly hold the cap against vibration, chatter, or rattling when it is applied to the wheel. The means shown for the purpose consists of a plurality, three being shown, of small tongues 8, which are punched or sheared outwardly from the skirt and engage the inner edge of the flange 3 to resiliently and frictionally hold the cap against rattle.

The cap and hub sleeve are provided with cooperating parts which lock the cap in place but enable it to be readily removed manually when desired. Broadly speaking, this is a bayonet coupling in the sense that one of said parts, the cap or hub, is provided with gateways or recesses through which projections on the other are permitted to pass, the locking effect being produced by relative rotation of the two parts when the gates are passed. In the specific embodiment shown the gateways are in the flange 3 of the hub, which is sheared out at several points, three in the instance shown, to provide the gateways or recesses 10. At one end of each gateway or recess, as at 11, there is a square shoulder, and the metal of the flange is otherwise undeformed. At the other end of each recess the metal of the flange is sheared circumferentially along the line 12, to form a tongue 13, which is formed with a slight depression 14 on one side and a hump 15 on the other to produce a "home" seat 16, beyond which the tongue is bent axially inwardly as at 13a, Fig. 3.

The drawings show three such gateways and tongues and the cap, therefore, is provided with three parts each cooperating with one of the recesses and tongues. The projections carried by the cap are in the form of resilient shoes or travelers 17, each consisting of a curved strip of inherently resilient material, such as spring metal, firmly secured intermediate its ends, as by the rivet 18, to the shank 19 of a holder or support passing through a bearing opening suitably formed in the skirt of the cap, as by punching the metal thereof radially inwardly to form an annular hollow teat or projection 20, inwardly of which the holder is provided with a head 21, as shown in Fig. 5. This arrangement provides sufficient bearing or holding surface in the skirt of the cap for the shank of the supporting member 19 and enables said member with its head and the shoe or traveler carried thereby to be mounted for free swivelling or turning motion about the axis of the shank 19. The curved shoe or traveler 17, of course, lies adjacent the outwardly extending flange or bead 5a of the cap and therefore has its motion limited to some extent, until either end of the shoe or traveler engages the transverse wall 6, but otherwise the shoes or travelers are freely swinging.

Fig. 3 shows a development of a portion of the edge of the hub flange 3, with the recesses and tongues thereof, and A, B and C, in the order named, represent successive positions of one of the shoes or travelers during the act of applying a cap to the hub. The cap held in the hand is placed co-axially with the hub and is moved endwise toward it, its travelers engaging the outside of the flange 3. It is then rotated clockwise in Fig. 1, in the form shown. When the cap first meets the hub the shanks 19 of its holders engage the flange 3, because the shoes or travelers are curved or bent toward the transverse wall 6 and terminate in rounded feet 17a. As the cap is rotated the members 19 travel along the hub flange 3 over the depressions 14 and thence inwardly of the sleeve along the inclined tongues 13a, permitting further endwise motion of the cap toward the hub. As the rotating motion is continued the following foot 17a drags along the inclined tongue 13a and tilts the advancing foot 17a inwardly with respect to the axis of the sleeve, as at B, so that it passes inwardly of the square shoulder 11 at the advance end of the gateway. The advancing foot 17a then travels along in engagement with the inner surface of the hub flange 3 and finally rides to a position in the "home" seat 16, as at C, where the following foot 17a lies inwardly of the flange 3. This is the final position, in which the spring shoe 17 has been flexed to more or less flatten it (compare C and A, Fig. 3), and both of its feet are in engagement with the inner surface of the flange 3, one of them being in the home seat 16. The cap is therefore resiliently and frictionally held against accidental escape and also is held by the tongue 8 against rattling. Reverse rotation is employed to remove the cap. A little extra force is necessary to start rotation and remove the advanced feet 17a from their home seats, and as the cap is rotated the formerly following and now leading feet 17a engage the tongues 13a, tilt the followers and travel up said tongues until finally the cap is entirely released by full motion of the shoes through the gateways.

What I claim is:

1. A closure of the class described, comprising a cup-shaped body member provided with a skirt, and locking members pivotally attached to said skirt and extending circumferentially thereof in each direction from the point of attachment.

2. A closure of the class described, comprising a skirted cap, and a series of resilient strips each extending circumferentially of the skirt and located externally thereof, each of said strips being pivotally connected intermediate its ends to the skirt.

3. In combination, a member to be closed having an annular flange provided with gateways, and a closure therefor comprising a skirted cap, the skirt of which enters the opening in said member and is provided externally with elongated resilient members adapted to be moved longitudinally of themselves through said gateways into frictional engagement with the inner surface of said annular flange.

4. In combination, a member to be closed having an annular flange provided with gateways, and a closure therefor comprising a skirted cap, the skirt of which enters the opening in said member and is provided externally with arcuate resilient members adapted to pass through said gateways and to be moved longitudinally of themselves upon rotation of the closure into frictional engagement with the inner surface of said annular flange, each of said resilient members extending circumferentially of the skirt.

5. In combination, a member to be closed having an annular flange provided with gateways, and a closure therefor comprising a skirted cap, the skirt of which enters the opening in said member and is provided externally with oscillatory resilient members adapted to pass through said gateways, each of said resilient members extending circumferentially of the skirt in both directions and provided at each end with a foot to travel on the flange of said member.

6. In combination, a tubular member having a radially extending flange at one end thereof, said flange being provided with spaced gateways therethrough, a closure having a skirt extending into the opening surrounded by said flange, and means for releasably locking said closure and said member together, said means comprising a plurality of resilient locking members arranged externally around said skirt, and means pivotally connecting said locking members to said skirt intermediate their ends whereby said members are tilted for movement through said gateways upon rotation of said closure.

In testimony whereof I hereby affix my signature.

JAMES S. REID.